United States Patent Office 3,476,689
Patented Nov. 4, 1969

3,476,689
COMPOSITION FOR USE IN STABILIZING CALCIUM CARBONATE IN COOLING WATER
Theodore R. Newman, Oak Lawn, Ill., assignor to Nalco Chemical Company, Chicago, Ill., a corporation of Delaware
No Drawing. Filed Jan. 3, 1967, Ser. No. 606,526
Int. Cl. C02b 5/04, 1/18
U.S. Cl. 252—175　　　　　　　　　　　　　5 Claims

ABSTRACT OF THE DISCLOSURE

A polyphosphate containing composition of improved solubility which is particularly suited for use in stabilizing calcium carbonate in cooling water and a method of treating cooling water to prevent calcium carbonate deposits. A typical composition of the invention is as follows:

| Components— | Weight percent |
|---|---|
| Sodium hexametaphosphate | 16.5 |
| Sodium tripolyphosphate | 58.5 |
| Sodium chloride | 25.0 |

THE DISCLOSURE

The use of polyphosphate compounds in treating cooling water to stabilize calcium carbonate and reduce calcium carbonate deposits is well known. Polyphosphate compounds are fed into cooling water systems either directly as dry materials or pre-dissolved to form aqueous solutions of relatively high concentration. In either method of feeding, the solubility of a polyphosphate composition is a critical factor in the treatment of the cooling water.

The solubility of a polyphosphate composition which is introduced directly into a cooling water system in the dry form, is critical. It is essential that the solubility of the composition is high enough to yield a level of dissolved polyphosphate which is sufficient to stabilize the calcium carbonate which is present. The solubility of the polyphosphate composition is even more critical in treatments wherein the polyphosphate is introduced to the cooling water in an aqueous solution. In solution feeding of polyphosphates, the solubility of the polyphosphate in water must be high enough to allow the total dosage for a cooling system to be dissolved in a relatively small amount of water to form the feed solution.

The solution method of feeding is most commonly used by industry, because it lends itself to relatively easy control by a method such as metering through a constant feed pump. A large segment of industry which employs cooling water treatment in this manner uses cold make-up water. This combination of conditions results in a need for a highly soluble polyphosphate composition.

Prior art polyphosphate compositions have been of particularly low solubility in cold water, resulting in a difficult problem to industry. It would, therefore, be of great benefit to the art if a composition was available for use in stabilizing calcium carbonate in cooling water systems which had a greatly improved solubility, particularly in cold water.

It, therefore, becomes an object of the subject invention to provide an improved composition for use in stabilizing calcium carbonate in cooling waters.

Another object of the invention is to provide a polyphosphate containing composition for use in stabilizing calcium carbonate in cooling water, which is characterized as having an improved solubility, particularly in cold water.

Yet another object is to provide a method of treating cooling water to prevent calcium carbonate deposits.

Other objects will appear hereinafter.

THE INVENTION

In accordance with the invention, a composition has been discovered which is extremely useful in stabilizing calcium carbonate in cooling water and which has a greatly improved solubility in cold water over prior art phosphate comopositions. Components of the composition of the subject invention are sodium hexametaphosphate, sodium tripolyphosphate and sodium chloride in weight percentages as set forth in Table I below.

TABLE I

| Component | Permissible Range | Preferred Range | Ideal Composition |
|---|---|---|---|
| Sodium hexametaphosphate | 5.0–25.0 | 10.0–20.0 | 16.0 |
| Sodium tripolyphosphate | 40.0–75.0 | 50.0–65.0 | 58.5 |
| Sodium chloride | 10.0–40.0 | 20.0–30.0 | 25.5 |

It has been discovered that the formulas shown in Table I are effective for stabilizing calcium carbonate in cooling water systems when used in quantities from 0.1–10.0 parts by weight of the composition of Table I per million parts by weight of cooling water. A more preferred dosage range for the compositions of Table I is from 0.5–5.0 parts by weight per million parts by weight of cooling water and most preferably from 1.0–3.0 parts by weight per million parts by weight of cooling water.

Sodium hexametaphosphate, sodium tripolyphosphate and sodium chloride are all well-known materials which are commercially available, as are a variety of other sodium phosphate salts. It is the choice of the particular phosphates used in the composition of the subject invention, in conjunction with sodium chloride in the percentage ranges as shown in Table I, which was found to be critical in providing a composition of improved solubility in cold water. The sodium chloride was found to be exceptionally useful in improving solubility as compared with other sodium salts, such as sodium carbonate.

The invention will be better understood by reference to the following illustrative examples:

EXAMPLE 1

Solubility tests were run on two compositions to determine their relative solubilities. The tests were run at room temperature and at a temperature corresponding to that normally found in cold water operating situations, such as mining operations. Composition B, corresponding to the ideal composition shown in Table I above, was tested simultaneously with prior art composition, composition A, of the following formula:

| Component— | Weight percent |
|---|---|
| Sodium tripolyphosphate | 50.0 |
| Sodium carbonate | 14.0 |
| Tetrasodium pyrophosphate | 36.0 |

The solubility tests were run as follows:

(a) The time required for dissolution of a 5% solution of each composition in Chicago tap water at 75° F. was determined. Five grams of each composition were gradually added with constant agitation to a 250 ml. beaker, which contained 95 ml. of Chicago tap water. The agitation was provided by a cone drive motor at 220 r.p.m., using a centrifugal "bell" type stirrer. The time to complete dissolution was recorded, as well as the final pH of the solution. These results are shown in Table II below.

(b) The time for dissolution of 5% by weight of each composition in Chicago tap water at 40° F. was determined by repeating the above procedure, using a beaker in an ice bath. The time to complete dissolution was recorded and is entered in Table II.

(c) The maximum solubility of each composition was determined by adding small increments of each composition to deionized water with vigorous agitation. These small increments were continually added until there was apparently no further dissolution. The results are shown in Table II.

TABLE II

| | Composition A | Composition B |
|---|---|---|
| Time for dissolution of 5% at 75° F | 195 seconds | 105 seconds. |
| Time for dissolution of 5% at 40° F | >24 hours | 60 minutes. |
| Maximum solubility at 75° F., percent | <10 | 15. |
| pH of 5% solution | 10.6 | 8.3. |

As the data in Table II demonstrates, the solubility of composition B is considerably better than the solubility of a typical prior art phosphate composition, composition A, at 75° F. and remarkably better at 40° F.

EXAMPLE 2

Calcium carbonate stabilization tests were conducted utilizing compositions A and B from Example 1. The stabilization tests were conducted in a laboratory model heat exchanger of the type described in U.S. 3,141,324, in which corrosion resistant stainless steel tubes were utilized to measure deposition of calcium carbonate under simulated service conditions.

Prior to commencing the test, specimen stainless steel heat exchange tubes were sandblasted, degreased in toluene and air dried. The tubes wer then passivated by immersing in 10% nitric acid solution for five minutes at room temperature. The tubes were then rinsed in deionized water, rinsed with acetone, air dried and dried for 1-2 hours at 180° F. After drying, the tubes were allowed to reach room temperature and weighed to the nearest 0.1 milligram.

The water used in these stabilization tests was a synthetic cooling tower water of an approximate analysis as follows:

Total hardness (as calcium carbonate) _____p.p.m__ 400-410
Calcium hardness (as calcium carbonate) __p.p.m__ 250
Magnesium hardness (as calcium carbonate) _____p.p.m__ 150
Total alkalinity (as calcium carbate) _____p.p.m__ 270-285
Sodium chloride _____p.p.m__ 500
Sodium sulfate _____p.p.m__ 1400
pH _____ 8.0+0.1

Sufficient water was prepared in a single batch for testing of both of the compositions. One liter was prepared for each test by addition of a treatment which consisted of a test composition in water from a stock solution. The tests were run over a period of 20 hours under conditions designed to simulate an actual heat exchanger, using each of the compositions and a control sample of untreated water.

After the three tests were run simultaneously, the tubes were removed and placed in a 180° F. oven for 1-2 hours. The tubes were removed from the oven, allowed to return to room temperature and weighed. This procedure was repeated several times using the same two compositions for two treated water samples and the synthetic cooling tower water for the standard sample. The deposit weight in an untreated standard test sample ranged from 20 to 25 milligrams.

The tests were repeated using treated samples with treatment levels of one-quarter, and one part by weight of each polyphosphate composition per million parts by weight of water. The result of the test of each of the treating compositions was reported and compared as "percent reduction in deposit weight." Percent reduction in deposit weight was determined as follows:

Percent reduction in Deposit $$= \frac{\text{Untreated Dep. Wt.} - \text{Treated Dep. Wt.} \times 100}{\text{Untreated Deposit Wt.}}$$

A comparison of the percent reduction in deposit weight obtained with the inventor's composition B and prior art type composition A is shown below in Table III.

TABLE III

| | Percent Reduction in Deposit Weight of $CaCO_3$ | |
|---|---|---|
| | A | B |
| Concentration added: | | |
| 1 p.p.m | 87.0 | 89.0 |
| ½ p.p.m | 56.0 | 63.0 |
| ¼ p.p.m | 32.0 | 54.0 |

It can be readily seen from the results in Table III that the reduction in deposit weight, which is directly related to the efficiency of a composition as a calcium carbonate stabilizer, is greater at all treatment levels for the composition of the subject invention than for the prior art composition, particularly at the lower treatment levels.

It is apparent from the above examples that the overall objectives of providing an improved composition for use in stabilizing calcium carbonate in cooling water and providing a method of treating cooling water to prevent calcium carbonate deposits have been achieved to a substantial degree. The tests outlined in Example 1 amply demonstrate the improved solubility, particularly in cold water, of a typical composition of the subject invention. The tests outlined in Example 2 demonstrate that a solution of a typical composition of the subject invention is more effective in stabilizing calcium carbonate than a solution of an equal concentration of a prior art polyphosphate composition.

Since the compositions of the subject invention are more effective as stabilizers than prior art polyphosphate compositions at a given concentration and their increased solubility makes it possible for treatments of higher concentrations to be used, the overall objectives of the subject invention have been substantially realized.

The invention claimed is:

1. A composition for use in stabilizing calcium carbonate in cooling water consisting of:

| Component— | Weight percent range |
|---|---|
| Sodium hexametaphosphate | 5.0–25.0 |
| Sodium tripolyphosphate | 40.0–75.0 |
| Sodium chloride | 10.0–40.0 |

2. A composition for use in stabilizing calcium carbonate in cooling water consisting of:

| Component— | Weight percent range |
|---|---|
| Sodium hexametaphosphate | 10.0–20.0 |
| Sodium tripolyphosphate | 50.0–65.0 |
| Sodium chloride | 20.0–30.0 |

3. A composition for use in stabilizing calcium carbonate in cooling water consisting of:

| Component— | Weight percent |
|---|---|
| Sodium hexametaphosphate | 16.5 |
| Sodium tripolyphosphate | 58.5 |
| Sodium chloride | 25.0 |

4. A method of treating cooling water to prevent calcium carbonate deposits consisting of adding 0.1–10.0 parts by weight of the composition of claim 1 per million parts by weight of cooling water.

5. A method of treating cooling water to prevent calcium carbonate deposits consisting of adding 0.1–10.0 parts by weight of the composition of claim 3 per million parts by weight of cooling water.

References Cited
UNITED STATES PATENTS

| | | | |
|---|---|---|---|
| 2,414,969 | 1/1947 | Moose | 252—175 |
| 2,751,357 | 6/1956 | Bowman et al. | 252—175 |
| 2,884,349 | 4/1959 | Axelrod | 252—80 |
| 2,890,175 | 6/1959 | Kipps | 252—175 |
| 3,412,180 | 11/1968 | Corley | 252—175 |
| 3,347,797 | 10/1967 | Kuegemann et al. | 252—175 |

LEON D. ROSDOL, Primary Examiner

I. GLUCK, Assistant Examiner

U.S. Cl. X.R.

21—2.7; 134—42; 210—57; 252—80, 387

PO-1050
(5/69)

UNITED STATES PATENT OFFICE
CERTIFICATE OF CORRECTION

Patent No. 3,476,689                    Dated November 4, 1969

Inventor(s) Theodore R. Newman

It is certified that error appears in the above-identified patent and that said Letters Patent are hereby corrected as shown below:

Column 2, line 18, Table I, "16.0" should read "16.5".

Column 3, line 34, "wer" should read --were--; column 3, line 50, "ate" should read --onate--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents